INVENTOR
C. W. JOHNSTONE
BY
ATTORNEY

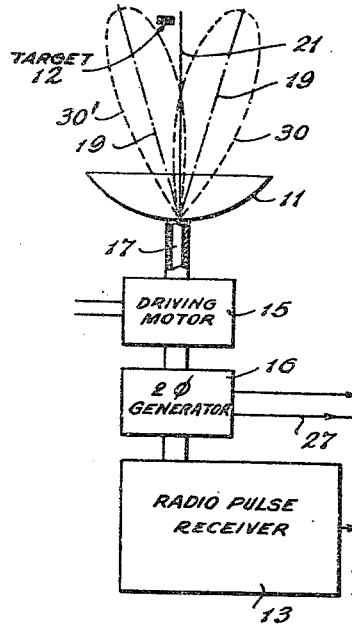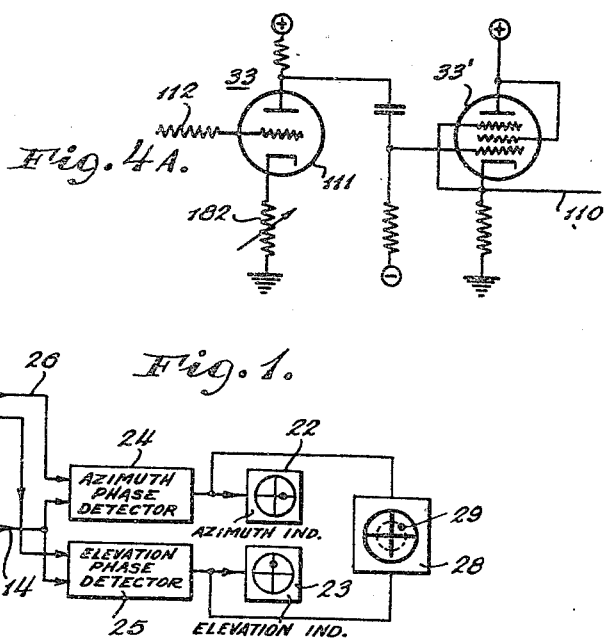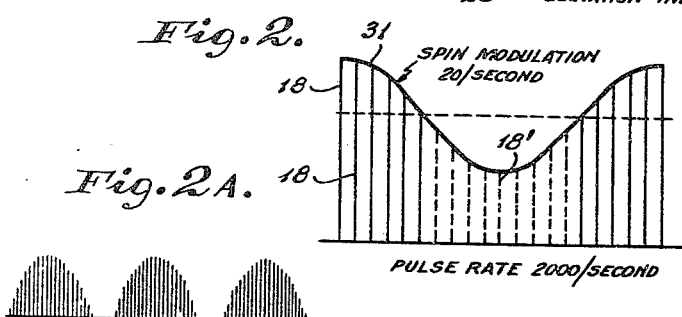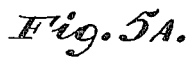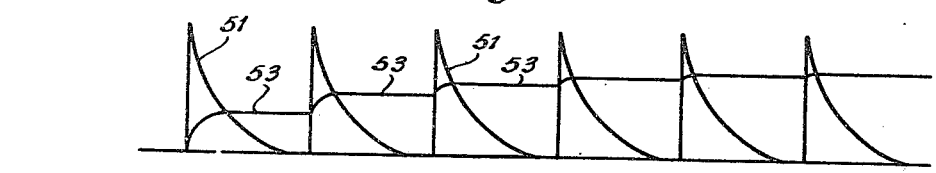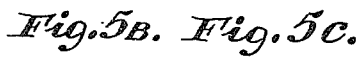

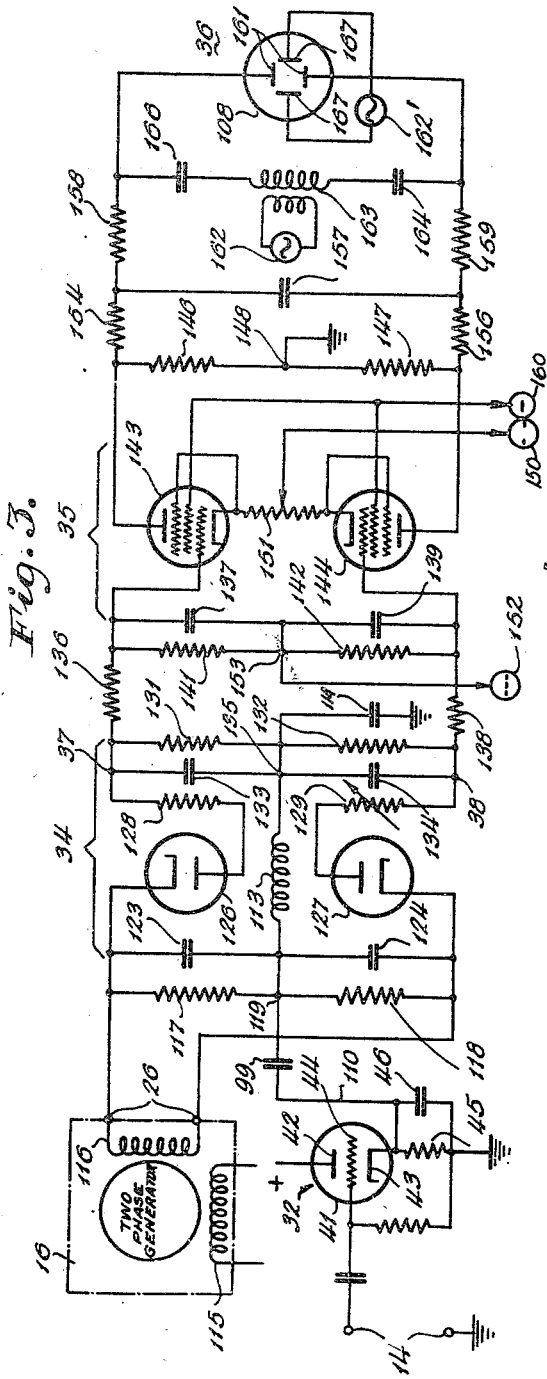
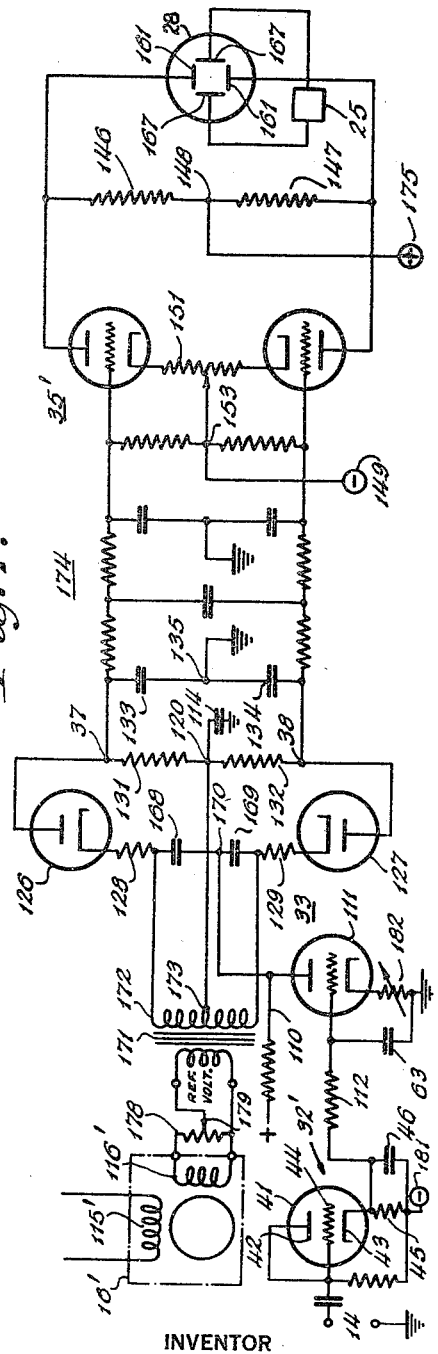
Fig. 3.
Fig. 4.

Patented Apr. 22, 1947

2,419,219

UNITED STATES PATENT OFFICE 2,419,219

PHASE RESPONSIVE CIRCUITS

Charles W. Johnstone, Garden City, N. Y., assignor to Sperry Gyroscope Company, Inc., a corporation of New York Application May 25, 1943, Serial No. 488,379

20 Claims. (Cl. 172—245)

The present invention relates to electrical circuits and concerns particularly phase responsive circuits and indicators.

An object of the invention is to provide an improved phase detector or phase angle indicator.

A further object of the invention is to provide an effective and efficient indicator of the phase and amplitude of the modulation envelope of a train of modulated pulses or separate groups of pulses, especially in relation to a substantially sinusoidal reference voltage.

Another object of the invention is to provide improved methods and apparatus for indicating orientation of an object detected by micro-wave radio-pulse locators of the conical scan and other types.

A further object of the invention is to provide a phase indicator of the rotating spot type in which the spot has a substantially circular locus for various values of phase to be indicated.

Still another object of the invention is to eliminate lag or phase shift in indications of phase relationship between a reference voltage and an input signal voltage or between the reference voltage and the modulation envelope of a train of continuous or bunched pulses.

Still another object of the invention is to overcome any deleterious effect of energy gaps between successive pulses of different amplitude in a train of continuous or bunched pulses, the modulation envelope of which is to be compared with a reference voltage in phase.

Other and further objects and advantages will become apparent as the description proceeds.

In carrying out my invention in its preferred form for determining the phase relationship between a modulated train of pulses and a reference voltage, for example when the modulated pulses are such as may be received in a microwave radio-pulse object locating system, I utilize a phase indicator of the opposing rectifier type. As in conventional phase indicators, I preferably utilize a reference voltage source to which the rectifier elements are connected in series opposition. However, I employ novel connections within the phase detector. A voltage divider is connected in series with the rectifier elements between them and a second voltage divider is connected across the reference voltage source. Input connections are made to intermediate terminals of the respective voltage dividers. Means are also provided for interconnecting the mid or neutral terminal of the reference voltage source and a neutral terminal between the rectifying elements.

For making the phase detector responsive to the phase relationship of the modulation envelope of a train of varying amplitude pulses without introducing phase shift, or thus causing phase indication error, I lengthen the input pulses while still keeping each pulse separate, and apply the lengthened pulses directly to the input connections of the phase detector.

A better understanding of the invention will be afforded by the following detailed description considered in connection with the accompanying drawings, and those features of the invention which are believed to be novel and patentable will be pointed out in the claims appended hereto.

In the drawings,

Fig. 1 is a schematic block diagram of a radio locating system in connection with which the invention of the present application may be employed.

Fig. 2 is a graph illustrating the principle of operation of the system of Fig. 1.

Figs. 2A and 2B are graphs representing modifications of the type of input signal shown in Fig. 2.

Fig. 3 is a circuit diagram of a phase detector and certain associated apparatus, forming a part of the system of Fig. 1 and constituting one embodiment of the present invention.

Fig. 4 is a circuit diagram of another embodiment of the invention representing a modified form of phase detector.

Fig. 4A is a diagram of a modification in part of Fig. 4.

Fig. 5A is a graph explanatory of the principle of operation of the apparatus of Figs. 3 and 4.

Figs. 5B and 5C are graphs further explanatory of the principle of operation of the apparatus of Figs. 3 and 4, showing the manner in which the input pulses are converted to a form producing an accurate response in the phase detector.

Figure 7A:
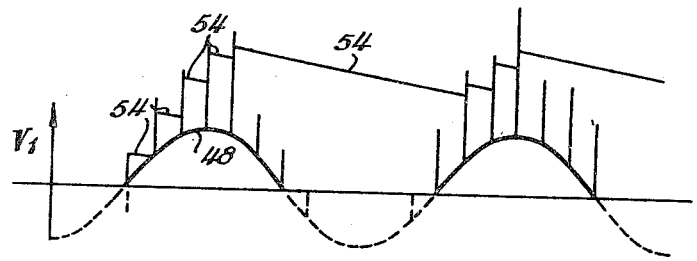
Figure 7B:
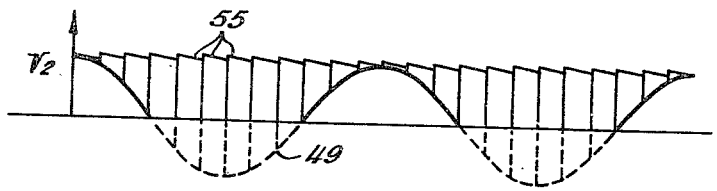
Figure 7C:
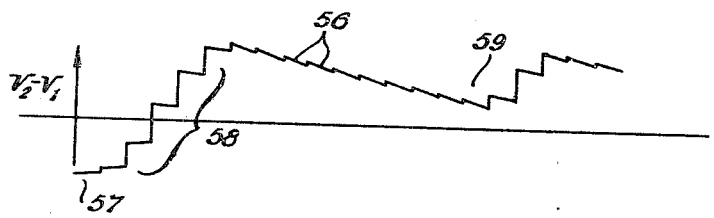

Figs. 7A, 7B, and 7C are graphs explaining the operation of the apparatus of Figs. 3 and 4 for the condition of difference in phase between the modulation of the input train of pulses and a reference voltage giving maximum output from the apparatus, i. e., phase opposition or 180° difference.

Figure 8A:
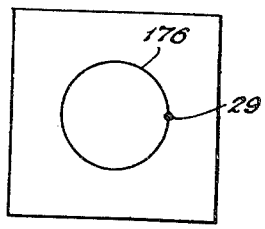
Figure 8B:
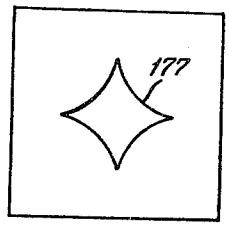

Fig. 8A is a diagram illustrating the preferred locus of the indicating spot of a rectilinear coordinate type of phase indicator or orientation indicator for a conical scan type of pulsed microwave object locator, and Fig. 8B is a diagram illustrating an undesired shape of locus for a rectilinear coordinate type of phase or orientation indicator which is avoided in accordance with the present invention.

Like reference characters are utilized throughout the drawings to designate like parts.

Although the phase sensitive apparatus and the method of phase indication described in the present application is not limited to employment in a particular type of apparatus or system, it is particularly useful in connection with a conical scan pulsed micro-wave type of object locator, such as illustrated schematically in Fig. 1; and the phase responsive system will accordingly be described in connection with such locator apparatus.

In one form of conical scan locator there is a common radiator 11 of the parabolic type serving both for transmitting pulses generated by a transmitter (not shown) toward a region in which a target 12 may be present and for receiving pulses reflected from such a target in case such a target is present and intercepts a radio beam radiated by the radiator 11. For detecting the reflected pulses picked up by the radiator 11 and converting them into signals of various types needed in a complete locator system, a radio pulse receiver 13 is provided. The present application is concerned only with phase detection or the indication of orientation of the target 12, and accordingly the receiver 13 is shown with only an output channel 14, at which signals appear which are variable in phase in accordance with variation in orientation of target 12.

For producing a conical scan of the beam radiated and received by the radiator 11, a driving motor 15 is provided; and for obtaining requisite reference voltages to enable indication of orientation of the target 12 with respect to azimuth and elevation, a two-phase generator 16 is provided which is rotated synchronously with the radiator 11 and the motor 15. A hollow shaft 17 is provided which serves both for supporting the radiator 11 and for providing a hollow pipe, radio transmission line channel to the radio pulse receiver 13. As represented schematically, the shaft 17 is the common shaft of the driving motor 15 and the generator 16, although it will be understood that in actual practice, a different construction may be employed.

The radio pulse receiver 13 includes a suitable detecting means for recovering the pulse envelope of micro-wave oscillations received by radiator 11. For example, it may include a superheterodyne type of receivers having a first detector, a local oscillator, an intermediate frequency amplifier channel and a second detector with suitable amplifiers for converting ultra high frequency input wave trains into separate pulses 18, as shown in Fig. 2, each of relatively short duration. The radiator 11 is so constructed that the center line 19 of the radiated and received beams is at an angle, for example a few degrees, to the axis of rotation 21 of the radiator 11 and the shaft 17, in order that the receiver output pulses will vary in magnitude and their modulation envelope will vary in phase in accordance with the orientation of the target 12 with respect to the axis of rotation 21 and a particular angular position of the shaft 17.

Separate indicators such as cathode ray oscilloscopes 22 and 23 may be provided for indicating the orientation of the target 12 in azimuth and elevation, respectively. For rendering the indicators 22 and 23 responsive to the modulated output from the channel 14 of the radio pulse receiver 13, azimuth and elevation phase detectors 24 and 25, respectively, are interposed between the output channel 14 of the receiver 13 and the indicators 22 and 23. Reference voltage connections 26 and 27 are provided from the two-phase generator 16 to the azimuth and elevation detectors 24 and 25, respectively. If desired, however, a single transverse or rectilinear coordinate indicator 28 may be provided which is responsive to both the azimuth and elevation phase detectors 24 and 25 for producing a moving spot or target 29, the position of which with respect to the center of the indicator screen indicates both the azimuth and elevation bearings of the target 12.

In a system such as illustrated in Fig. 1, the transmitter, which is not shown, produces pulses of micro-wave energy or trains of high frequency radio oscillations which are separated by time intervals which are considerable in relation to the length of the pulse or train of oscillations. In some systems, a repetition rate of 2000 per second is employed and the pulse duration is substantially a microsecond. Corresponding pulses are received by the radiator 11 and the pulse receiver 13 when transmitted microwaves are intercepted by a target 12. Such pulses are represented by the vertical lines 18 in Fig. 2. The radiator 11 is so constructed that its receptivity pattern is a relatively narrow lobe 30 so that the strength of the received pulses is greater when the center line 19 of the pattern is directed toward the target 12 than when there is an angle therebetween. Since the center line 19 of the receptivity pattern or beam is not along the axis of rotator 21, the rotation or spin of the radiator 11 will produce a variation in the strength of the received pulses. This variation or spin modulation will have a frequency corresponding to the speed of rotation of the radiator 11. For example, if this rotation is 20 revolutions per second the spin frequency modulation will also be at a frequency of 20 cycles per second. Such modulation of the received pulses is represented by the modulation envelope 31 in Fig. 2.

In some locator systems, demodulators or detectors have been included in the pulse receiver for recovering the pulse modulation envelope 31 and supplying it to the azimuth and elevation phase detectors. Such demodulation, however, may introduce a phase shift and tend to cause errors in the phase detection or indication of orientation. In accordance with the present invention, therefore, not the modulation envelope 31, but the actual received pulses 18 are supplied to the phase detectors 24 and 25. In accordance with the invention, the phase detectors are so designed as to be responsive directly to such pulses.

The phase detectors 24 and 25 may be similar in construction and therefore only one of them need be considered. One form of phase detector is illustrated in Fig. 3, in which the input connection is a pair of terminals 14 corresponding to the output channel 14 from the radio pulse receiver 13 as shown in Fig. 1.

The phase detector apparatus of Fig. 3 comprises a pulse-lengthening stage 32, a phase-responsive or rectifier stage 34, a direct current amplifier stage 35, and a cathode ray indicator 36 with suitable interconnections and filters which will be described in greater detail hereinafter.

In Fig. 1 the position of the receptivity pattern 30 when the angular position of the radiator 11 moves 180° from the position assumed in the drawing is represented by the receptivity pattern 30' shown in dotted lines. Thus, for any position of the target other than along the axis of rotation 21, there will be a modulation of the received pulses and the received pulses will have the maximum strength for a given angular position of the radiator 11. With variation in orientation of the target 12, the amplitude and phase relationships of the pulse modulation envelope 31 will vary. Accordingly, by comparing the phase relationship of the pulse modulation envelope 31 with a standard or reference voltage by means of the azimuth phase detector 24, the orientation of the target 12 in azimuth may be read from the azimuth indicator 22, and likewise the orientation in elevation may be read from the elevation indicator 23; or if preferred, the two indications may be combined in a single indicator 28 in which the orientation is indicated by the rectilinear coordinates of the spot 29.

The two-phase generator 16 is represented in Fig. 3 as having separate output windings 115 and 116 and the output terminals 26 of the winding 116 serve as the reference phase voltage terminals 26 of the azimuth phase detector. The phase detector per se or rectifier stage 34 includes a pair of asymmetrical current-conducting elements, such as unilateral or rectifying elements 126 and 127, connected in series opposition to the reference phase voltage terminals 26. The stage 34 also includes a pair of input terminals 119 and 135, which constitute mid-terminals of voltage dividers 117—118 and 133—134 connected respectively across the reference voltage terminals 26 and between the rectifying elements 126 and 127. The output terminals of the phase detector per se, terminals 37 and 38, are the end terminals of one of the voltage dividers consisting of condensers 133 and 134 in series. These terminals 37 and 38 serve as the input terminals to the direct current amplifier 35, the output of which is supplied to the cathode ray indicator 36.

The pulse lengthening stage 32 as illustrated in Fig. 3 comprises a cathode-follower triode vacuum tube 41, having an anode 42 connected to a suitable source of positive potential and a cathode 43 together with a control electrode or grid 44. The pulse receiver output terminals 14 are resistance-capacitance coupled to the grid 44.

For producing the requisite pulse lengthening, a cathode resistor 45 connected in series with the cathode lead of the tube 41 is provided with a bypass condenser 46. The time constant of the combination of the resistor 45 and the bypass condenser 46 is so chosen as to lengthen the pulses 18 substantially no more than the time interval between pulses; for example, the time constant of the elements 45 and 46 may be of the order of one-fourth the period between pulses.

In the apparatus of Fig. 3, the pulses from the receiver 13 are impressed after lengthening, across a high impedance such as a choke coil 113 in series with blocking condensers 99 and 114. If desired, the choke coil 113 may be replaced by a suitable high resistance. The output of one phase of the two-phase generator 16 such as derived in the winding 116 is impressed across series connected resistors 117 and 118, whose junction 119 is connected to the high potential end of the choke coil 113.

The resistors 117 and 118 are respectively bypassed by condensers 123 and 124 whereby the lengthened pulse output of the receiver 13, appearing across choke coil 113, may be impressed upon respective rectifiers illustrated as diodes 126 and 127 together with the voltages appearing across resistors 117 and 118 which will be of the low rotational frequency of the generator 16. It will be clear that the voltages across resistors 117 and 118 will be of opposite phase. These resistors are so selected that these voltages are substantially equal. Connected in series with the diodes 126 and 127 are respective resistors 128 and 129. The resistors 128 and 129 are selected to be of a low resistance value but high in comparison with the internal resistance of the diodes 126 and 127, so that variations in these internal resistances such as those due to aging or to non-uniformity in various tubes are minimized with respect to their effect on the circuit. If desired, one or both of the resistors 128 and 129 may be made variable in order to provide a net resistance in each of these circuits of substantially the same value.

Also connected in circuit with the diodes 126 and 127 are respective load resistors 131 and 132 bypassed by condensers 133 and 134, and having a junction terminal 135 at the low potential end of the choke coil or impedance 113. The time constant of the resistance-capacitance circuit comprising the condenser 133 and the resistor 128 plus the diode 126 should be made very small in an ideal case in order to permit substantially instantaneous charging of the condenser 133 by means of the short duration pulses applied thereto from the input terminals 14 through the diode 126.

The time constant of the circuit elements 131, 133, however, is preferably made very large in order to maintain the charge of the condenser 133 between successive pulses and between successive cycles of the rotation frequency. Preferably, this latter time constant is made of the order of twice the period of rotation. The same considerations apply to the diode 127 and its associated circuit elements. Therefore, in the absence of pulses applied from the channel 14 through the stage 32, the rectifiers 126 and 127 will serve as half wave rectifiers for the equal rotation frequency voltages applied oppositely thereto from the resistors 117 and 118.

Accordingly, the condensers 133 and 134 will be charged to substantially equal and opposite voltages whereby the resultant voltage across the series connected pair of resistors 131 and 132 will be zero. If pulses are additionally applied to the diodes 126 and 127 from the stage 32 having, for example, a modulation envelope in phase with the voltage across the resistor 117, it will be seen that these pulses will increase the amplitude of the voltage applied to the diode 126 and will accordingly increase the voltage applied to the condenser 133. At the same time, this modulation envelope will be of opposite phase with respect to the voltage of the resistor 118 and will accordingly decrease the voltage applied to the condenser 134. As a result, a net unidirectional voltage will be developed across the resistors 131 and 132. Should the phase of the pulse modulation envelope be opposite to that just described, it will be clear that the polarity of the resultant voltage across resistors 131 and 132 will be reversed. For intermediate phases of the modulation envelope with respect to the reference voltage supplied by generator 16, corresponding intermediate values of output voltage across resistors 131 and 132 will be produced. In this way, the output voltage across the series pair of resistors 131, 132 will represent the phase relationship between the modulation envelope and the reference voltage.

If this reference voltage bears a predetermined phase relation with respect to the elevation or azimuth variation of the orientation of the receptivity pattern 30, it will be clear that the output voltage will then represent the corresponding component of the relative displacement between the rotation axis 21 and the object orientation. The net voltage output is further filtered by means of resistor condenser networks 136, 137 and 138, 139 to eliminate rotation frequency and higher frequency ripple components and is then applied by means of input resistors 141 and 142 to the push-pull direct-current amplifier 35 comprising tubes 143 and 144. The amplifier tubes 143 and 144 have respective load resistors 146 and 147 connected to the anodes thereof and to ground as at 148. A high negative potential is applied from a suitable terminal 150 to the cathodes of the tubes 143 and 144 through a suitable balancing potentiometer 151 connected in the cathode legs of these amplifier tubes. A suitable biasing voltage for the input grids of tubes 143, 144 is supplied from a terminal 152 by way of the junction 153 of resistors 141 and 142.

In this manner, the push-pull output voltage appearing across the resistors 146, 147 will also represent the relative displacement component referred to above. Further filtering means comprising resistors 154, 156 and condenser 157 may be provided, if necessary, or may be omitted, if desired. The output of filter circuit 154, 156, 157 is then applied through coupling resistors 158, 159 to the deflecting plates 161 of the cathode ray tube indicator 36 which may be the indicator 22 or 23 of Fig. 1. This unidirectional voltage thus applied to indicator 36 serves to displace the cathode ray beam trace in a direction and by an amount corresponding to the corresponding component of the relative displacement to be indicated.

Superposed upon this unidirectional voltage is a suitable alternating voltage derived from a source 162 by way of a transformer 163 and coupling and blocking condensers 164, 166. An alternating voltage of frequency equal to that of the source 162 and phase displaced 90 degrees with respect thereto is applied to the other set of deflecting plates such as 167 from a source 162'. The effect of these two alternating voltages is, as is well known, to produce a circular beam trace. This trace is then deflected in one sense or the other under the control of the unidirectional voltage output of the phase detector shown in Fig. 3 to provide an indication of the relative displacement or tracking error in either the elevation or azimuth component.

It will be clear that, if the circuit of Fig. 3, for example, is utilized as the azimuth phase detector 24 of Fig. 1, a corresponding circuit differing only in that the reference voltage is obtained from winding 115 of the generator 16 will be utilized as the elevation phase detector 25 of Fig. 1 actuating the elevation indicator 23.

It has been pointed out that the time constant of the series resistor 128 and the condenser 133, and likewise the time constant of the elements 129 and 134, should be relatively small to insure rapid charging of the condensers 133 and 134 by the input pulses in order to avoid loss of the modulation envelope of the pulses. It has also been pointed out that the time constant of the condenser 133 with the shunt resistor 131, as well as the time constant of the corresponding elements 134 and 132, should be relatively large, this being requisite to the proper functioning of the circuit as a phase detector.

These two requirements are mutually contradictory with regard to the selection of the capacitance of the condensers 133 and 134, and make difficult the selection of suitable design constants for the other elements of the circuit. Accordingly a compromise is necessarily made in the circuit of Fig. 3 with regard to the capacitance of the condensers 133 and 134.

If desired, the inductance coil 113 of Fig. 3 may be omitted or replaced by a non-inductive impedance. This circuit may also be modified to supply the input pulses through voltage dividers having intermediate or junction terminals disconnected from the neutral points of the reference voltage of winding 116 and the rectifier load resistors 131 and 132.

Fig. 4 shows a modification of the phase detector apparatus of Fig. 3 in which the condensers 133 and 134 may be made large. In this instance the condensers 133 and 134 form a voltage divider and have a junction terminal 135 which is grounded to form one of the pulse input terminals. Likewise, condensers 168 and 169, connected in series to form a voltage divided, are connected across the reference voltage source and have a common terminal 170. The terminal 170 serves as the second pulse input terminal.

In order to supply sufficient current for charging the condensers 133 and 134 although the latter be made large, a buffer amplifier 33 is interposed before the pulse input terminals 135 and 170.

The buffer amplifier stage 33 comprises a vacuum tube 111, which is preferably provided with a grid resistor 112 for preventing over-driving of the tube 111 and for rounding off the peaks of the pulses which are transmitted through the pulse lengthening stage 32'.

The pulses from the receiver 13, after lengthening, are applied in the apparatus of Fig. 4 to the grid of the buffer amplifier tube 111 through the resistor 112. The effect of the resistor 112 in combination with the very small inter-electrode capacitance 63 of tube 111 is to round off the sharp peaks of the pulses in order to prevent over-driving of the tube 111 and consequent distortion of the relative amplitudes of the pulses which would seriously affect the modulation envelope, which it is desired to compare. These rounded pulses are amplified by the buffer amplifier 33. The terminal 170 is connected to the input lead 110 from the pulse amplifier tube 111. The lead 110 is thus non-conductively coupled to the rectifiers 126 and 127.

Satisfactory operation will be obtained in Fig. 4 without the resistors 128 and 129. The condensers 168 and 169 may be relatively large, e. g., as large as the condensers 133 and 134.

If desired, the reference voltage derived from the winding 116 of the generator 16 may be supplied to the rectifiers 126 and 127 through the interposition of a transformer 171 having a secondary winding 172 with a mid terminal or neutral terminal 173 connected to the junction terminal 120 of the rectifier load resistors 131 and 132. For large signal input greatest accuracy is obtained if the points 173 and 120 are tied to ground by the condenser 114, which has a capacitance large in comparison with that of condensers 133 and 134.

In Fig. 4 a modified type of direct current amplifier 35' employing triodes instead of pentodes is shown, and, if desired, a double stage filter 174 may be interposed between the phase detector output terminals 37, 38 and the direct current amplifier 35'. As shown, the direct current amplifier 35' is connected push-pull, with the anode or load resistors 146 and 147 connected at the junction terminal 148 to the positive terminal 175 of the power supply source, and with the cathodes connected through a divided cathode resistor 151 and a tap 153 to the negative terminal 149 of the power supply source. The tap 153 thus is the only part of the circuit having a conductive connection to ground, since the power supply source is assumed to be grounded.

The effect of choosing relatively small values of capacitance for the condensers 133 and 134 in Fig. 3 in order to maintain small time constants of the combinations 128, 133 and 129, 134 is illustrated in Fig. 6. This figure assumes that the pulses from the input terminals 14 are fed directly to the pulse input terminals 119 and 135 without interposition of the pulse lengthening stage 32.

Figure 6A:
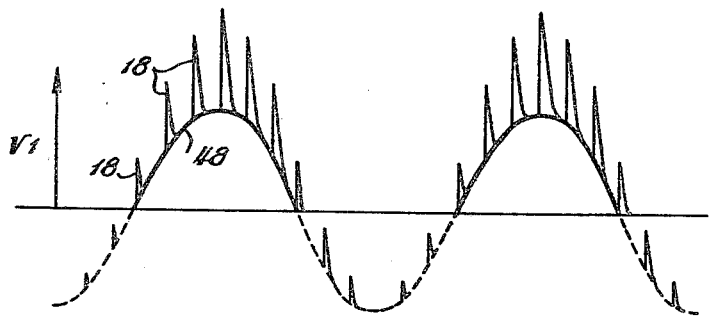
Figs. 6A, 6B and 6C are graphs illustrating the action which would take place in the phase detector were pulse lengthening not employed in accordance with the invention of the present application.

Referring to Figs. 2 and 6A, for phase coincidence of the pulse envelope with the reference voltage, the pulses 18 passing through one of the rectifiers 126 will be superimposed on the reference voltage 48 to produce an output V₁. It frequently happens that the pulses 18 are not really sinusoidally modulated, but occur in bunches with intermediate pulses 18' (Fig. 2) very weak or entirely omitted as in Fig. 2A. In some cases there may be bursts of as few as four pulses, as in Fig. 2B. These conditions further add to the difficulty of obtaining a proper phase detector action when the output of one-half of the phase detector, such as the rectifier 126, for example, has the wave form illustrated in Fig. 6A.

Figure 6B:
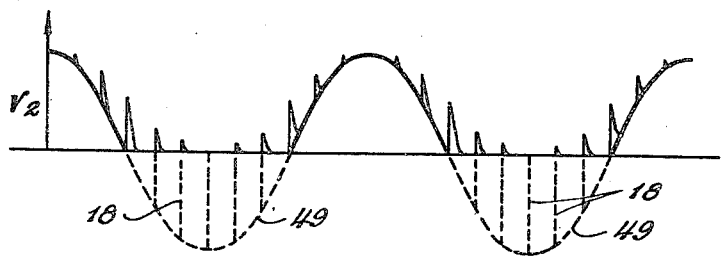

In the other half of the phase detector illustrated by the rectifier 127, for example, the output voltage V₂ has the wave form represented in Fig. 6B with the positive pulses 18 superimposed on the negative counterpart 49 of the reference voltage wave. The resultant output wave appearing between the phase detector output terminals 37 and 38 and applied to the direct current amplifier 35 has the wave form illustrated in Fig. 6C. Even after such a wave form is passed through the filter comprising the elements 137, 139, 141, and 142, its direct current component is so small and so uncertain that the output of the direct current amplifier 35 does not give an adequate or definite indication of the phase relationship between the envelope of the modulated pulses or groups of pulses 18, and the reference voltage 48.

Figure 6C:
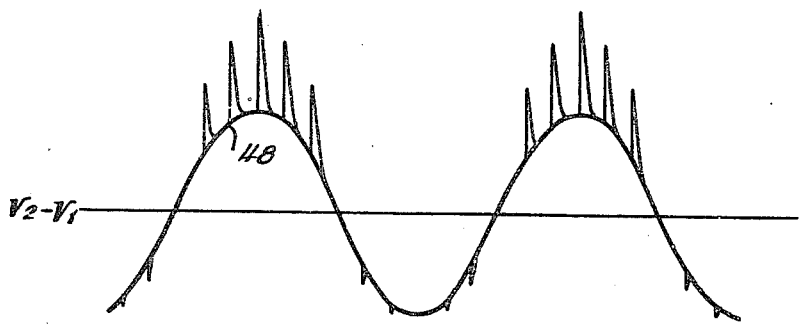

The curves of Figs. 6A, 6B, and 6C are drawn to represent the condition of phase coincidence between the modulation envelope of the pulses 18 and the reference voltage 48, in which the maximum direct current output should appear between the terminals 37 and 38.

The output wave shown in Fig. 6C would be improved by lengthening the input pulses as by means of the pulse lengthening stage 32. Nevertheless, in order to produce the desired time constant of the circuit 45—46 with adequate voltage output from this circuit it is necessary to make the resistance of the element 45 relatively large and the capacitance of the element 46 relatively small. This limits the capacitance of the condensers 133 and 134 to a relatively small value, since they must be charged from the condenser 46. Preferably, therefore, an amplification stage 33 is provided, as shown in Fig. 4. The amplifier 33 builds up the level of the pulse lengthener output to such a value that large condensers may be employed as the elements 133 and 134. The increased length of charging period together with maintenance of adequate voltage level of the signals applied to the condensers 133 and 134 permits charging the condensers 133 and 134 adequately even when they are made large. Even in the case of a 2000 cycle repetition rate of the pulses and a 20 cycle per second spin frequency of the modulation, I have found that the condensers 133 and 134 may be charged sufficiently for proper phase detector action if the input pulses 18 are lengthened to the time duration of the order of 50 microseconds. Each pulse then supplies about one-tenth of the charge necessary to bring the condensers 133 and 134 to peak voltage. A greater degree of pulse lengthening may, of course, be employed provided the pulses 18 are not lengthened to a duration exceeding the time interval between pulses, as such excessive lengthening would have the effect of introducing phase shift.

In Fig. 5A a train of lengthened pulses 51 is shown which has been produced by passing the pulses 18 through the pulse lengthening stage 32' and the amplifier or pulse rounding stage 33. The lengthening effect of the stage 32' is represented by the curve of Fig. 5B, and the effect of the pulse rounding grid resistor 112 is represented by the curve of Fig. 5C.

If the pulses 51 of Fig. 5A are passed through the rectifiers 126 and 127 of Fig. 4, to charge the condensers 133 and 134, without superimposing the reference voltage, one or the other of the condensers will be charged to successively higher potentials, represented by the irregular line 53.

Fig. 7 illustrates the effect of passing lengthened pulses, such as the pulses 51 of Fig. 5A, to the rectifiers 126 and 127 and superimposing the reference voltage for the condition corresponding to Fig. 6, namely, phase coincidence between the pulse modulation envelope and the reference voltage wave 48. The lengthened pulses 51 superimposed on the reference voltage 48 will result in an output voltage wave V₁ represented by an irregular line 54 in Fig. 7A, corresponding to the line 53 of Fig. 5A. Similarly, the lengthened pulses pass through the other rectifier, in this case the rectifier 127, and are superimposed on the negative counterpart 49 of the reference voltage wave, as shown in Fig. 7B, to produce the irregular voltage line 55, representing the voltage V₂. The resultant output voltage V₂—V₁ is represented in Fig. 7C by the irregular line 56.

It will be observed that the resultant voltage rises from the initial value 57 during an initial build-up period 58, after which it remains at an average positive value represented by the line 59. Thus the output wave has a direct current component which is smoothed by the filter 174 and amplified by the direct current amplifier 35'.

In case the pulses are supplied with a modulation envelope of reversed phase, the phase detector output will be a direct current of opposite polarity, and in case of a phase quadrature relation between the modulation envelope and the reference voltage, the curve 56 of Fig. 7C will become an irregular line lying substantially along the zero axis of the graphs and producing an average zero output.

Fig. 4 also represents a modification in which two phase detectors supply a single indicator 28 in order to produce an orientation indication or phase indication in rectilinear coordinates on a single indicating screen. The output of the direct current amplifier 35' is shown as supplied to one pair of deflecting plates 161 of the cathode ray indicator 28, the other pair of deflecting plates 167 of the indicator 28 being supplied by phase detector apparatus 25 similar to that shown in Fig. 4 but having as reference voltage source the quadrature winding 115' of the generator 16'.

When orientation of the located object 12 is indicated on a single screen supplied by two phase indicators, the indicated spot or target 29 (Fig. 1) should follow a circular path when the target 12 follows a circular path around the axis of rotation 21 of the radiator 11. In other words, for equal angular departures of the target 12 from the axis of rotation 21, the spot 29 should have a circular locus. Such a locus is represented in Fig. 8A by a circle 176.

I have found, however, that when employing low pulse repetition rates or when separate groups of pulses are received, if the magnitude of the reference voltage supplied to the phase indicators is allowed to become excessive, the locus of the spot 29 is not circular, as in Fig. 8A, but a curve 177 resembling a hypocycloid of four cusps as shown in Fig. 8B. In order to avoid the shape of locus shown in Fig. 8B and obtain a substantially circular locus of the spot 29, I prefer to maintain the magnitude of the reference voltage applied to each diode substantially of the same order as the magnitude of the pulse envelope of the pulses supplied to the phase detector apparatus from the amplifier-buffer, or less. For this purpose I may interpose a potentiometer 178 between the generator winding 116' and the transformer 171 as illustrated in Fig. 4. As shown, the potentiometer 178 is provided with an adjustable tap 179 for adjusting the peak-to-peak voltage of the secondary winding 172 to correspond substantially to twice the peak-to-peak voltage at the pulse input connection 110. In other words, the relative magnitudes of the input voltages from the reference voltage source and the pulses supplied to the phase detector apparatus should be such that the condensers 133 and 134 are charged by the pulses and never by the peak values of the reference voltage even when the pulses occur only as narrow separate groups or bursts.

By suitable modification of time constants, the apparatus of Figs. 3 and 4 may be employed in connection with microwave locator systems and other pulse systems varying over a wide range of frequencies, such as from a 400 cycle per second pulse repetition rate and a 100 cycle modulation or spin frequency to a 2000 cycle per second pulse repetition rate and a 20 cycle per second modulation or spin frequency. Furthermore, with a fixed set of constants the apparatus is well adapted for variable-frequency modulation systems because no demodulator is required. This results also in a saving in transformers and increases accuracy.

Although as shown in Fig. 3 a grid controlled vacuum tube type of pulse lengthener 32 may be employed, I have found that a more clear-cut action in the lengthening of the pulses may be obtained by the use of a rectifier or diode 32', as illustrated in Fig. 4. The pulse lengthener 32' may comprise an actual diode, or, if desired, the triode 41 connected as a diode, by having its anode 42 and its control grid 44 connected together. A fixed bias for the tube 111 may be provided by connecting the negative end of the pulse lengthener resistor 45 to a negative bias terminal 181 instead of to ground.

The buffer amplifier stage 33 may be made adjustable as shown in Fig. 4. A rheostat 182 is utilized as a cathode resistor for the purpose of providing adjustability of pulse input to the phase detector. The rheostat 182 may be set at a high value of resistance for limiting the amplitude of the pulse input to the phase detector apparatus. The rheostat 182 may be used alone or in conjunction with the potentiometer 178 for obtaining a suitable amplitude relationship between the reference voltage and the pulse voltage.

For the most accurate operation the condensers 168 and 169 should be substantially discharged between pulses and should have a low-impedance input instead of a high-impedance input. The amplifier 33 may be replaced or followed by a cathode-follower stage 33', as shown in Fig. 4A, which provides a low impedance input to the phase detector per se or rectifier stage.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A phase detector comprising a reference voltage source, a pair of diodes connected in series opposition to said source with a pair of resistors connected in series between the diodes, the resistors having a junction terminal serving as a first input terminal, a second pair of resistors connected across the reference voltage source with a junction terminal serving as a second input terminal, an impedance connected between said junction terminals, and connections for supplying to said junction terminals a voltage the phase of which is to be compared with that of the voltage delivered by said reference voltage source.

2. Apparatus as in claim 1 with a plurality of condensers, each connected across one of the resistors.

3. A phase detector comprising a pair of terminals to which a reference voltage source may be applied, a circuit connected to said terminals including rectifying elements in series opposition and a voltage divider interposed between said rectifying elements in said circuit and having an intermediate terminal serving as a first input terminal, a voltage divider connected across said reference voltage terminals having an intermediate terminal serving as a second input terminal, means interconnecting said input terminals, and means for supplying thereto a voltage the phase of which is to be compared with that of the voltage at the reference voltage terminals.

4. A phase detector comprising, in combination, terminals to which a reference voltage may be applied, a circuit connected to said terminals including rectifying elements in series opposition with a voltage divider interposed between said rectifier elements, said voltage divider having a mid terminal serving as a first input terminal, a second voltage divider connected across the reference voltage terminals and having a mid terminal serving as a second input terminal, and connections for supplying to said input terminals a voltage the phase of which is to be compared with that at the reference voltage terminals.

5. A phase detector comprising, in combination, two pairs of terminals to which voltages may be applied which are to be compared in phase, a circuit connected to the first pair of terminals including rectifying elements in series opposition with a voltage divider interposed between said elements, said voltage divider having a mid terminal connected to one of the second pair of terminals, and a second voltage divider connected across the first pair of terminals and having a mid terminal connected to the second of the second pair of terminals.

6. A phase detector comprising a pair of terminals to which a reference voltage may be applied, rectifying elements connected to said terminals, a pair of resistors connected between said rectifier elements in series therewith to form a series circuit between said terminals, said resistors having a junction terminal, a neutral terminal with means for maintaining it at a potential intermediate the potentials of said reference voltage terminals, a connection between said neutral terminal and said junction terminal, a voltage divider connected between said reference voltage terminals and having an intermediate terminal serving as a first input terminal, a non-conductive voltage divider connected across said series pair of resistors and having an intermediate terminal serving as a second input terminal, connections for supplying to said input terminals a voltage the phase of which is to be compared with that of the voltage at said reference voltage terminals, and output connections from the ends of said series pair of resistors.

7. A phase detector comprising a pair of terminals to which a reference voltage may be applied, rectifying elements connected to said terminals, a pair of resistors connected between said elements in series therewith to form a series circuit between said terminals, said resistors having a junction terminal, a neutral terminal with means for maintaining it at a potential intermediate the potentials of said reference voltage terminals, a connection between said neutral terminal and said junction terminal, a non-conductive voltage divider connected to said reference voltage terminals and having an intermediate terminal serving as a first input terminal, and a second input terminal with means for maintaining it at a potential intermediate the potentials at the ends of said series pair of resistors, connections for supplying to said input terminals a voltage the phase of which is to be compared with that of the voltage at said reference voltage terminals, and output connections from the ends of said series pair of resistors.

8. A phase detector comprising first and second pairs of input terminals to which voltages may be applied which are to be compared in phase, rectifying elements connected to the first of said pairs of terminals, a pair of resistors connected between said elements in series therewith to form a series circuit between said terminals, said resistors having a junction terminal, a neutral terminal with means for maintaining it at a potential intermediate the potentials of said first pair of input terminals, a connection between said intermediate terminal and said junction terminal, a non-conductive voltage divider connected to said first pair of input terminals and having an intermediate terminal connected to one of said second pair of terminals, means for maintaining the other of said second pair of terminals at a potential intermediate the potentials at the ends of said series pair of resistors, and output connections from the ends of said series pair of resistors.

9. A phase detector comprising, in combination, a reference voltage source having end terminals and a mid terminal, a pair of resistors and a pair of rectifying elements connected in series to said end terminals, the resistors being between said rectifying elements and having a common terminal connected to the mid terminal of said reference voltage source and the rectifying elements being arranged in series opposition, a pair of condensers connected in series between the reference voltage end terminals and having a common terminal serving as a first input terminal, a second pair of condensers connected in series between the rectifying elements having a common terminal serving as a second input terminal, output connections from the ends of the series pair of resistors, and connections to said input terminals for supplying a voltage the phase of which is to be compared with the phase of the reference voltage.

10. A phase detector as in claim 5 with resistors interposed between the rectifying elements and the first pair of terminals for compensating any inequalities in the rectifying elements.

11. A phase detector comprising, in combination, first and second pairs of input terminals to which voltages may be applied which are to be compared in phase, a reference voltage source connected to said first pair of terminals, a mid terminal with means for maintaining it at a potential intermediate the potentials of the terminals of said first pair, a pair of resistors and a pair of rectifying elements connected in series between said first pair of input terminals, said resistors being between said rectifying elements and having a common terminal connected to said mid terminal and said rectifying elements being arranged in series opposition, a pair of condensers connected in series between said first pair of input terminals and having a common terminal connected to one of said second pair of input terminals, a second pair of condensers connected in series between said rectifying elements and having a common terminal connected to the other of said second pair of input terminals, and output connections from the ends of said series pair of resistors.

12. In combination, a phase detector having direct-current output connections, a cathode ray oscilloscope having input connections, a direct-current amplifier interposed between the output connections of the phase detector and input connections of the cathode ray oscilloscope, means interposed in the input connections to the cathode ray oscilloscope for super-imposing an alternating voltage on the direct-current output of the amplifier, and means for supplying to the cathode ray oscilloscope an alternating deflection force in phase quadrature with the aforesaid alternating voltage for producing a circular trace in the cathode ray oscilloscope whereby phase variations detected by the phase detector serve to shift the circular trace of the cathode ray oscilloscope to indicate variations in phase.

13. Apparatus for detecting variations in phase of the modulation envelope of a modulated train of pulses comprising, in combination, input connections adapted to receive a train of pulses, a pair of phase detector input terminals, a pulse lengthener interposed between said pulse input connections and phase detector input terminals, reference voltage terminals to which a reference voltage may be applied, rectifying elements connected in series opposition between said reference voltage terminals, a voltage divider included in the series connection between said rectifying elements and having an intermediate terminal connected to one of said phase detector input terminals, and a second voltage divider connected across said reference voltage terminals and having an intermediate terminal connected to the second of said phase detector terminals, whereby unidirectional voltage appears across said first voltage divider varying in polarity and magnitude with the phase relationship between voltage supplied to said reference voltage terminals and the modulation envelope of pulses supplied to said pulse input terminals.

14. A phase detector as in claim 5, with a pair of resistors each interposed in series between one of the rectifying elements and the first voltage divider, one of said interposed resistors being adjustable for balancing characteristics of the rectifying elements.

15. Apparatus for detecting variations in phase of the modulation envelope of a modulated train of pulses comprising, in combination, input terminals adapted to receive a train of pulses, a first pair of phase detector input terminals, a second pair of phase detector input terminals, a pulse lengthener interposed between the pulse input terminals and said first pair of detector input terminals, connections for supplying a reference voltage to said second pair of phase detector input terminals, asymmetric current-conducting elements connected in series opposition between the first of said pairs of phase detector input terminals, a voltage divider included in the series connection between said elements having an intermediate terminal and connected to one of said second pair of phase detector input terminals, and a second voltage divider connected across said first pair of phase detector input terminals and having an intermediate terminal connected to the other of said second pair of phase detector input terminals, whereby unidirectional voltage appears across said first voltage divider varying in magnitude and polarity with the phase relationship between the voltage supplied to said reference voltage terminals and the modulation envelope of pulses supplied to said pulse input terminals.

16. Phase detector apparatus comprising an adjustable reference voltage source, an opposing-rectifier type of phase detector having a pair of reference voltage terminals connected to said source, having input terminals to which may be connected a source of voltage the phase of which is to be compared with that of the reference voltage, and having output terminals for connection to an indicator, with means for adjusting the peak-to-peak reference voltage to a value of the same order of magnitude as the peak-to-peak voltage supplied at said input terminals.

17. A visual phase indicator comprising, in combination, connections for supplying an input voltage, a pair of phase detectors, each having an input connection from said input voltage connections and a pair of reference voltage terminals, means for supplying a pair of reference voltages in quadrature to respective pairs of reference voltage terminals of the phase detectors, an indicating device having two pairs of input connections for producing mutually transverse deflections of an index, output connections from one phase detector to one of said indicator input connections, output connections from the second phase detector to the other of said indicator input connections, and means for maintaining the peak-to-peak amplitude of the voltages at the reference voltage terminals at substantially the same order of magnitude as the peak-to-peak amplitude of the voltage at the input terminals for maintaining a substantially circular locus of the index of the indicator.

18. A phase detector comprising, in combination, a first pair of input terminals, a second pair of input terminals, a pair of asymmetric current-conducting elements connected in circuit to said first pair of input terminals, means connecting a point in the circuit of said asymmetric elements to one of said second pair of input terminals, means for maintaining the other of said second pair of input terminals at a potential intermediate the potentials of the first pair of input terminals, and output connections from two points in the circuit of said asymmetric elements.

19. In combination, a circuit responsive to the phase relationship between a reference voltage and a signal voltage, having a pair of input terminals to which a reference voltage may be applied, and a second pair of input terminals to which a signal voltage may be applied, and a pulse lengthener connected in advance of the signal voltage terminals for making the circuit responsive to phase relations between voltage at the reference voltage terminals and the modulation envelope of modulated pulses which may be applied to the pulse lengthener.

20. In combination, a condenser-rectifier type of phase detector with first and second connections for receiving a reference voltage and modulated pulses, respectively, and a pulse lengthener interposed in the second connection.

CHARLES W. JOHNSTONE.

REFERENCES CITED

The following references are of record in the file of this patent:

UNITED STATES PATENTS

| Number | Name | Date |
|---|---|---|
| 2,012,480 | Reich | Aug. 27, 1935 |
| 2,092,081 | McLennan | Sept. 7, 1937 |
| 2,285,038 | Loughlin | June 2, 1942 |
| 2,318,197 | Clark | May 4, 1943 |
| 2,178,074 | Jakel et al. | Oct. 31, 1939 |
| 2,227,598 | Lyman et al. | Jan. 7, 1941 |
| 2,328,985 | Luck | Sept. 7, 1943 |
| 2,263,377 | Busignies et al. | Nov. 18, 1941 |
| 2,231,929 | Lyman | Feb. 18, 1941 |

FOREIGN PATENTS

| Number | Country | Date |
|---|---|---|
| 406,903 | British | Mar. 8, 1934 |